(12) United States Patent
Infanti

(10) Patent No.: US 7,454,239 B2
(45) Date of Patent: Nov. 18, 2008

(54) HANDHELD WIRELESS COMMUNICATION DEVICE AND HOLDER

(75) Inventor: James C. Infanti, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 589 days.

(21) Appl. No.: 11/000,456

(22) Filed: Dec. 1, 2004

(65) Prior Publication Data

US 2006/0116183 A1 Jun. 1, 2006

(51) Int. Cl.
*H04M 1/00* (2006.01)
(52) U.S. Cl. .................... 455/575.8; 455/117; 455/128; 455/550.1; 379/445; 379/455
(58) Field of Classification Search .............. 455/575.8, 455/550.1, 117, 128, 575.1, 575.3, 575.6, 455/556.1; 379/446, 455, 454
See application file for complete search history.

(56) References Cited

U.S. PATENT DOCUMENTS

| 5,535,439 | A  | * | 7/1996 | Katz ......................... 455/117 |
| 5,857,157 | A  | * | 1/1999 | Shindo ........................ 455/551 |
| 6,397,078 | B1 | * | 5/2002 | Kim ......................... 455/556.2 |
| 6,983,169 | B2 | * | 1/2006 | Vogel et al. ............... 455/550.1 |
| 2003/0109275 | A1 | * | 6/2003 | Vander Veen et al. ........ 455/550 |

FOREIGN PATENT DOCUMENTS

WO 02/054363 7/2002

OTHER PUBLICATIONS

Canadian Intellectual Property Office, Office Action for corresponding CA Appln. No. 2,488,538, Aug. 12, 2008.

* cited by examiner

*Primary Examiner*—Matthew Anderson
*Assistant Examiner*—Shaima Q Aminzay
(74) *Attorney, Agent, or Firm*—Borden Ladner Gervais LLP; Jeffrey W. Wong

(57) ABSTRACT

A holder for a handless wireless communication device has triggering means at more than one location interacting with detecting means in the handheld wireless communication device for the handheld wireless communication device to detect whether or not it is present in the holder in any one of several possible orientations therein. The location of each of the triggering means corresponds to a different one of the possible orientations. In a more specific aspect of the invention, magnets are installed in the holder at more than one location, each location corresponding to a location sufficiently close to the detecting means, for example a proximity switch, in one of several orientations of the device in the holder. In a specific embodiment of the invention, the holder has outer and inner panels, and there is one magnet in the outer panel and one magnet in the inner panel, so that a proximity switch near a front or rear surface of the device will be sufficiently close to one of the magnets whether the device is inserted with its front surface facing out, or with its front surface facing in. An example of such a holder is a belt-clip holster.

7 Claims, 2 Drawing Sheets

HANDHELD WIRELESS COMMUNICATION DEVICE AND HOLDER

BACKGROUND OF THE INVENTION

1. Field of the Invention

This invention relates to a handheld wireless communication device, and to a holder for same. More particularly, the invention relates to features which sense whether or not the device is present in the holder.

In at least one typical handheld wireless communication device, the device automatically goes into "sleep" mode when placed in its holster, and switches to an active mode when removed from the holder. There may also be other reasons why it is desirable to know whether or not the device is in the holder. Some means of sensing whether or not the device is in the holder is therefore required.

A typical holder for a handheld wireless communication device is a holster which incorporates a belt clip, so that the user can store the device conveniently on his or her belt when the device is not in use. For convenience, the word "holster" will be used frequently in this specification, but it should be understood that the invention is applicable to any holder for the device which is separate therefrom, not just a holster.

2. Description of the Prior Art

Some prior art handheld wireless communication devices and holder have incorporated means for detecting the presence of the device in the holder. For example, some holders have included a mechanical means in the holder which is engaged by the device, triggering a switch in the device.

In at least one prior art holster, there is a magnet which is positioned to interact with and trigger a proximity switch (e.g. Hall effect) in the device for the device to thereby sense whether or not it is in the holster. However, some devices can be inserted in their holsters (or other holders) in more than one orientation. In such other orientation(s), the magnet and proximity switch may not be properly aligned or close enough to each other for the magnet to trigger the proximity switch.

SUMMARY OF THE INVENTION

In view of the above, it is an object of the invention to provide a handheld wireless communication device and holder combination in which there is sensing of the presence of the device in the holder in more than one orientation of the device in the holder.

Therefore, according to one aspect of the invention, the holder has triggering means at more than one location interacting with means in the handheld wireless communication device for the handheld wireless communication device to detect whether or not it is present in the holder in any one of several possible orientations therein. The location of each of the triggering means corresponds to a different one of the possible orientations.

In a more specific aspect of the invention, magnets are installed in the holder at more than one location, each location corresponding to a location sufficiently close to means in the device for sensing the magnet, for example a proximity switch, in one of several orientations of the device in the holder.

According to a specific embodiment of the invention, there may be a holder having outer and inner panels, and there may be one magnet in the outer panel and one magnet in the inner panel, so that a proximity switch near a front or rear surface of the device will be sufficiently close to one of the magnets whether the device is inserted with its front surface facing in, or with its front surface facing out. An example of such a holder is a belt-clip holster. Preferably but not necessarily, the proximity switch may be on an axis of symmetry of the device, so that the magnets may be centered opposite each other.

Further details of the invention will be described or will become apparent in the course of the following detailed description and drawings of a specific embodiment of the invention, as an example only.

BRIEF DESCRIPTION OF THE DRAWINGS

The invention will now be described with reference to the accompanying drawings of a preferred embodiment of the invention, by way of example only. In the drawings.

DETAILED DESCRIPTION OF THE INVENTION

Figure 3:
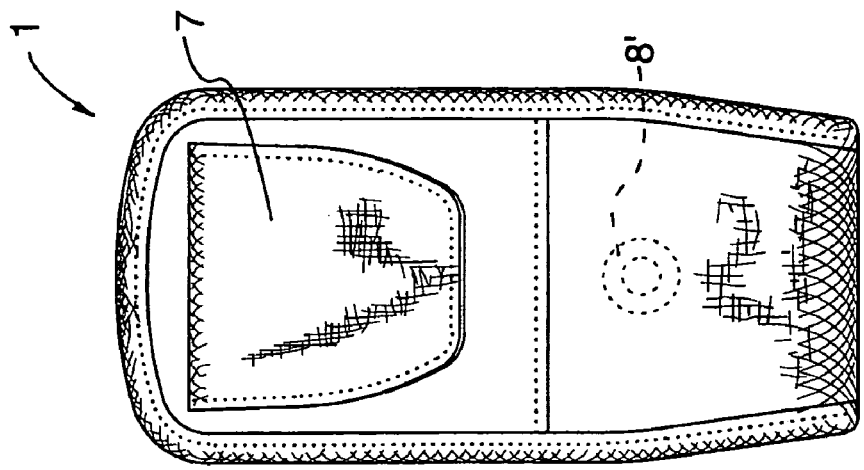
FIG. 3 is a rear view of the FIG. 1 holster, with the other magnet shown by hidden lines.

The drawings show a typical holder according to the invention, in this case a holster 1. The holster has a pocket area 2 defined by an inner panel 3, an outer panel 4, side walls 5, and a floor 6. The construction of the holster is not material to the invention, but typically the inner panel, floor and outer panel will be integral, i.e. in one piece, with the side walls sewn thereto. The sidewalls may or may not be elasticized. The panels may or may not be stiffened by any suitable means.

Figure 2:
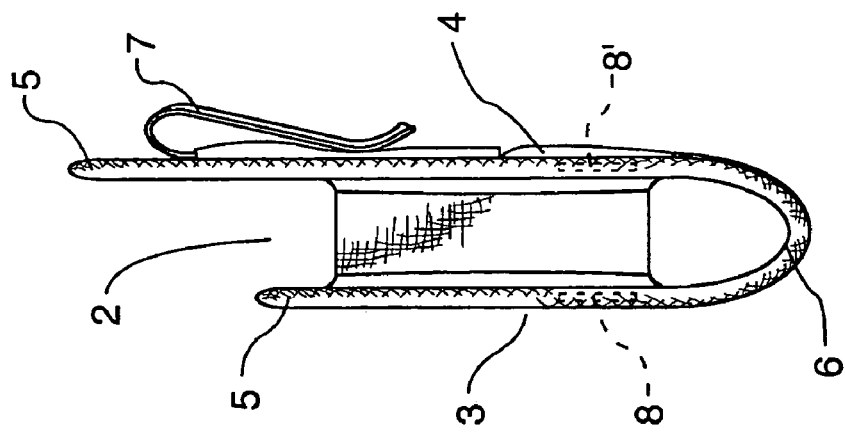
FIG. 2 is a side view of the FIG. 1 holster, with both magnets shown by hidden lines.
Figure 1:
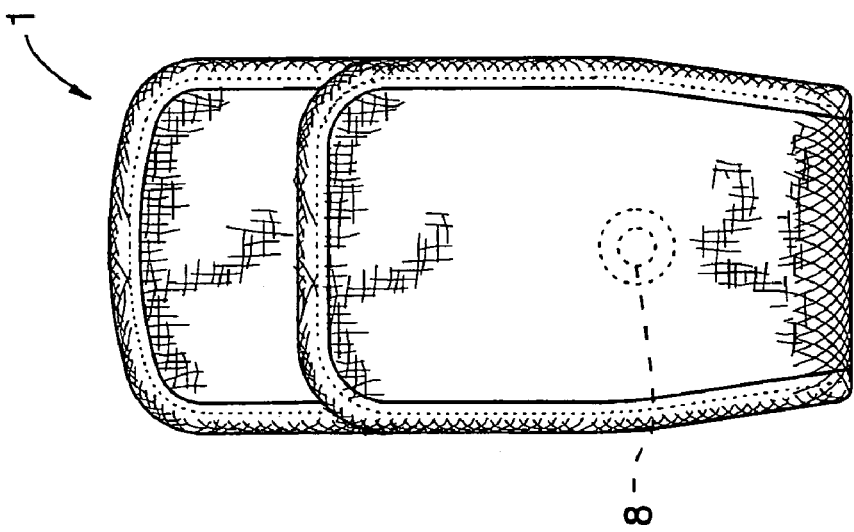
FIG. 1 is a front view of a holster, with one of two magnets shown by hidden lines.
Figures 4, 5:
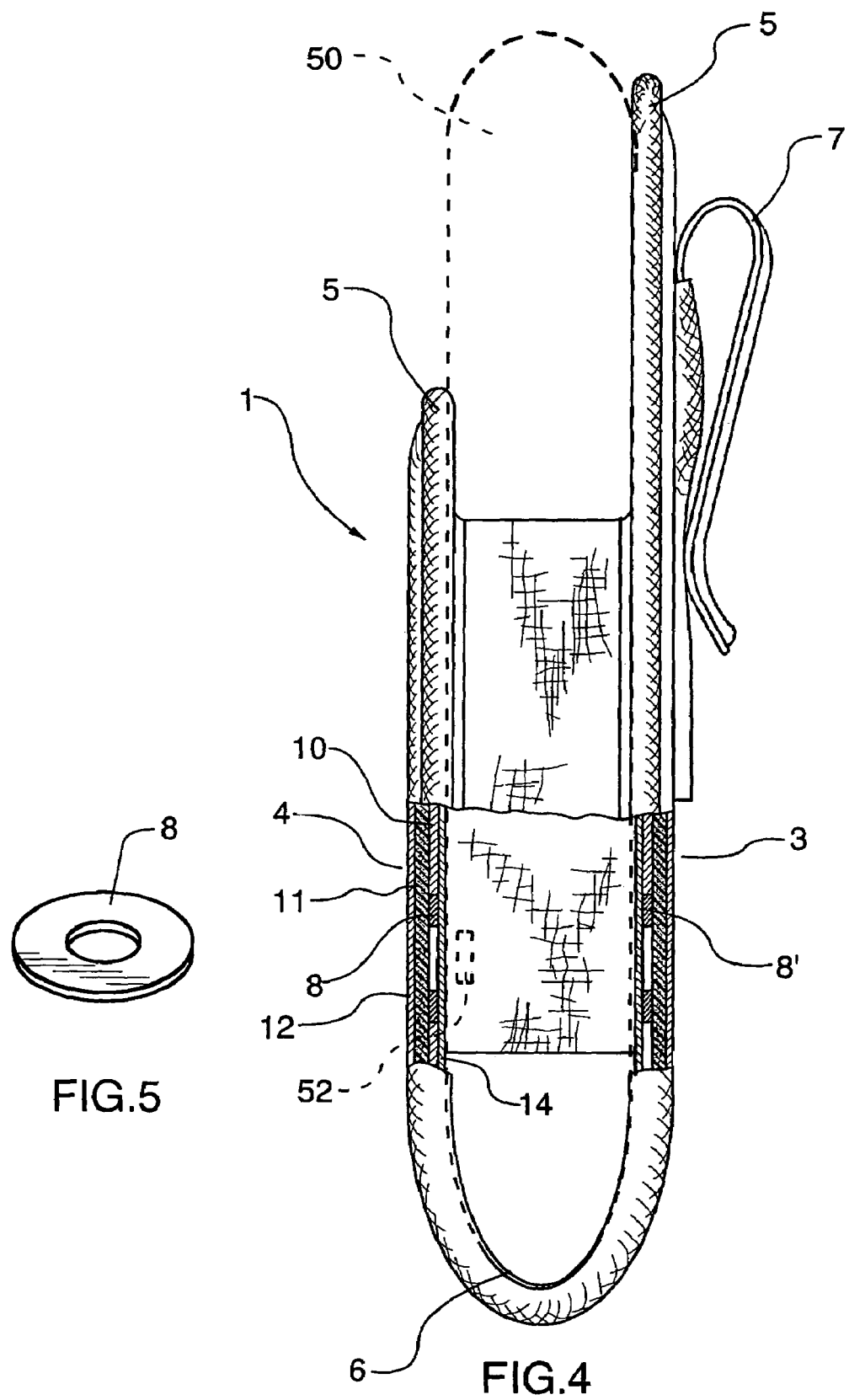
FIG. 4 is a partial cross-sectional side view of the FIG. 1 holster, with a typical handheld wireless communication device shown in dotted lines.
FIG. 5 is a perspective view of one of the typical magnets.

The preferred embodiment is a belt-mountable holster. Accordingly, extending from the back of the inner panel is a belt clip 7, as seen in FIGS. 2-4.

In the handheld device 50, a proximity switch 52 is located near a front or rear surface thereof. In the illustrated example, it is near the rear surface of the device, as represented schematically in FIG. 4. (The device is usually but not necessarily positioned in its holster with its rear surface facing out, and its display facing in, i.e. towards the inner panel of the holster. Generally, it is preferable to locate the proximity switch near a front or rear surface of the device, rather than on its front-to-back centerline, to minimize the magnet strength (flux) required to trigger the switch. Preferably in most cases, that surface is the rear surface, so as to not interfere with other components of the device, for example a keypad or display screen.

As can be seen readily from the drawings, when the device is positioned in its "normal" manner in the holster, the proximity switch 52 aligns generally with, and is located close to, the magnet 8 in the inner panel 3.

A problem, however, is that with some handheld devices, it is possible to replace the device in the holder (a holster or otherwise) in one of several orientations. That is not a disadvantage, and in fact may be considered advantageous in that the user does not need to think about how the device is oriented, or change from whatever orientation is most convenient. But without the benefit of the present invention, there is a risk that the presence of the device in the holder would not be properly sensed.

Therefore, the invention provides an additional magnet corresponding to the location of the proximity switch for each possible orientation. Thus in the illustrated embodiment, there is a second magnet 8', installed in the outer panel 4 of the holster. The precise method of installation is not critical, but in the preferred embodiment each magnet is captured in a pocket defined in stiffening material such as cardboard, heavy vinyl or ABS 10. A layer of foam 11 may be outside the stiffening material and magnets, and the assembly is captured between inner and outer finished layers 12 and 14. Sewing or other means may be used around the pocket so that the magnet cannot escape, or as in the preferred embodiment, the magnet may be bonded to the foam layer 11.

Preferably, the proximity switch in the device is on an axis of lateral symmetry thereof, i.e. centered from side to side so that the magnets 8 and 8' can be centered on their respective panels, for slightly easier manufacture. Obviously, however, the proximity switch can be offset from the axis, with the magnets offset accordingly. As seen from looking towards the outer panel of the holster, thus one would be offset to the left, and the other to the right, so as to align with the proximity switch in either orientation of the device.

From a height viewpoint, obviously it is desirable for the magnets and proximity switch to all be at approximately the same height when the device is in the holder (holster or otherwise). Precise alignment is not critical, but the magnets need to be close enough to the proximity switch to trigger it.

Variations on the invention and its example(s) described above will be apparent or may become apparent to those knowledgeable in the field of the invention. Therefore, the following claims which define the invention are not restricted to the specific example(s) described above.

It should be specifically understood that the specific positions of the magnets as described above are not critical, as long as they generally align with the proximity switch when the device is in the holder.

It should also be understood that the invention is not limited to the holder being a belt-mountable holster. It could be a desktop cradle, for example, active or passive; or a battery charger; or any other holder where the device may from time to time be placed.

With respect to the detecting means, it should be understood that although magnets and a proximity switch constitute the presently preferred embodiment, the invention is not limited to that and contemplates other means, another example being mechanical means such as prongs at several holder locations, to engage corresponding mechanical means in the device.

With respect to the proximity switch, any element capable of detecting the presence of the magnet is contemplated. This would normally be a "Hall effect" switch.

What is claimed is:

1. A handheld wireless communication device, in combination with a holder for same, said holder having a magnet at more than one location positioned to interact with a proximity switch in said handheld wireless communication device for said handheld wireless communication device to detect whether or not it is present in the holder in any one of several possible orientations therein, the location of each said magnet corresponding to a different one of said possible orientations;

wherein said holster has outer and inner panels, a bottom, and two side panels, with two said magnets positioned in opposing panels.

2. A combination as in claim 1, wherein said holder is a belt-mountable holster.

3. A combination as in claim 1, wherein said proximity switch is located generally on a vertical axis of symmetry of said handheld wireless communication device, and said magnets are centered horizontally on said outer and inner panels.

4. A combination as in claim 1, wherein said opposing panels are said outer and inner panels.

5. A holder for a handheld wireless communication device, said holder having magnets installed therein at more than one location, positioned so as to trigger a proximity switch in said handheld wireless communication device when said handheld wireless communication device is positioned in said holder in any one of at least two possible orientations of said device in said holder, the location of each said triggering means corresponding to a different one of said possible orientations;

wherein said holster has outer and inner panels, a bottom, and two side panels, with two said magnets positioned in opposing panels.

6. A holder as in claim 5, wherein said holder is a belt-mountable holster.

7. A holder as in claim 5, wherein said opposing panels are said outer and inner panels.

* * * * *

UNITED STATES PATENT AND TRADEMARK OFFICE
CERTIFICATE OF CORRECTION

PATENT NO. : 7,454,239 B2
APPLICATION NO. : 11/000456
DATED : November 18, 2008
INVENTOR(S) : James C. Infanti It is certified that error appears in the above-identified patent and that said Letters Patent is hereby corrected as shown below:

Column 4, line 16, delete "holster" and insert therefor --holder--; and

Column 4, line 36, delete "holster" and insert therefor --holder--.

Signed and Sealed this

Thirteenth Day of January, 2009

JON W. DUDAS
*Director of the United States Patent and Trademark Office*